United States Patent [19]
Goldfarb

[11] Patent Number: 5,258,306
[45] Date of Patent: Nov. 2, 1993

[54] SILO COMPOSTING APPARATUS

[76] Inventor: Kenneth Goldfarb, 20 York Ave., Monticello, N.Y. 12701

[21] Appl. No.: 858,093

[22] Filed: Mar. 26, 1992

[51] Int. Cl.$^5$ ............................................. C12M 1/06
[52] U.S. Cl. ..................... 435/315; 435/316; 435/813; 435/819; 422/184
[58] Field of Search .............. 435/41, 128, 243, 287, 435/290, 299, 300, 304, 305, 307, 308, 309, 310, 312, 313, 315, 316, 819, 818; 422/184; 71/8, 9; 366/102, 103, 287; 34/209-212, 237, 229, 241

[56] References Cited

U.S. PATENT DOCUMENTS

| | | | |
|---|---|---|---|
| 413,137 | 10/1889 | Free et al. | 366/287 |
| 700,033 | 5/1902 | Glatz | 366/103 |
| 2,126,168 | 8/1938 | Breuchaud | 435/310 |
| 2,474,833 | 7/1949 | Eweson | 71/9 |
| 2,680,069 | 6/1954 | Eweson | 366/102 |
| 3,756,784 | 9/1973 | Pittwood | 422/194 |
| 3,960,537 | 6/1976 | Kaelin | 71/9 |
| 4,358,540 | 11/1982 | Itoh et al. | 71/9 |
| 4,374,804 | 2/1983 | Easter | 422/184 |

FOREIGN PATENT DOCUMENTS 2426285 12/1975 Fed. Rep. of Germany ............ 71/9

*Primary Examiner*—Michael G. Wityshyn
*Assistant Examiner*—William H. Beisner
*Attorney, Agent, or Firm*—Sandra M. Kotin

[57] ABSTRACT

A silo or cylindrical composting apparatus containing more than one chamber, each of which is fitted with two or more sets of agitator arm assemblies, a system of sweep paddles, and a shielded exit port with a slidable panel cover. The agitator arm assemblies are supported at the common central shaft and at the circumference of the chamber. The central shaft revolves and likewise causes the agitator arm assemblies and sweep paddles to revolve with it. A unique ring gear track about the circumference of the chamber articulates with a gear of each agitator arm assembly and causes the arm assemblies to rotate as they revolve. Air is supplied to the composting mass through the central shaft and into the air delivery pipes which are a part of each agitator arm assembly. A heat collecting system removes excess heat from the upper chambers and makes it available for use in the lowermost chamber if needed. The central shaft is made to revolve by means of a drive wheel powered by a motor located outside the silo. Fan blowers also located outside the silo bring in fresh air.

14 Claims, 7 Drawing Sheets

SILO COMPOSTING APPARATUS

FIELD OF THE INVENTION

The instant invention relates to an apparatus for composting waste organic materials. The apparatus can be used for municipal garbage, lawn and garden waste products and sludges. More particularly, the instant invention relates to a chambered silo composting apparatus provided with constant agitation of and air circulation within the composting mass at more than one site in each of the chambers.

BACKGROUND OF THE INVENTION

Composting as a means to breakdown organic refuse has been known and practiced for probably thousands of years. Now that the problem of solid waste disposal has reached overwhelming proportions, all available methods are being explored and reevaluated. This is probably more the case with composting methods then any other, principally, because composting is a simple and environmentally safe means to process solid waste materials with the added advantage of a useful end product. In essence, composting is recycling, not merely burying or reducing the waste to toxic ash. We are just now seeing the beginning of municipal and industrial composting.

Composting is a natural process, the means by which turns raw organic waste into a useful material, one that can be mixed back into the soil to refurbish it with lost nutrients.

The composting process is an aerobic microbial decomposition of organic materials. Heat is generated during the process as well as carbon dioxide and water. When sufficient oxygen is present, odors are kept to a minimum and can easily be controlled. The microorganisms necessary for composting are usually present in the raw materials. Often, harmful microorganisms are also present, but these are eliminated by the heat generated during the decomposition. Careful temperature control of the composting mass is essential to attain the desired end.

Originally, composting was achieved by creating piles of compost material. As the method became more widely used long rows of composting material were found to be more efficient, since there could be better air circulation. This method, called windrows is still in use today, with modifications to make the process more efficient. An example can be seen in U.S. Pat. No. 4,230,676.

Horizontal composting tanks or containers have also been found to be effective. To these have been added mechanical means to mix or agitate the material during the composting period and to provide better inclusion of air and water when needed. The mixing also helps to evaporate excessive moisture. Such methods also provide better temperature regulation of the mass which in turn speeds the process. For example see U.S. Pat. No. 3,451,799. Means to improve fluid control through a composting mass were developed by Laurenson, Jr. (U.S. Pat. Nos. 4,837,153 and 4,410,349).

Johannsen, in U.S. Pat. No. 4,730,400 describes a drum reactor for aerobic fermentation having a rotary drum with air pipes along the outer shell whereby a plurality of jets deliver air and humidity along the length of the drum as it turns, thus insuring better circulation throughout the decomposing material.

Sellew et al. in U.S. Pat. No. 4,869,877 teaches an elaborate and efficient system of bays in an enclosed building with a controlled ventilation system. Sensors actuate the system as the temperature in the composting mass reaches a preset value. This system can handle large quantities of municipal refuse in a continuous manner with new material introduced at a beginning point as the previously introduced material is moved along, finally to be removed automatically when the desired product is attained.

A method using modular containers is taught by Egarian (U.S. Pat. No. 4,956,002).

The method of Schiene et al. utilizes a set of orifices in the floor of the reaction chamber through which low intensity pressurized air is introduced. A ram and a surge of pressurized air are used to move the mass along through the composting chamber. (U.S. Pat. No. 5,023,178).

The newer horizontal systems have been found to be quite efficient, but require a large area of space for the systems to operate effectively. The silo or vertical chamber composting systems require much less ground area. The raw material must be raised to the top of the silo where it is introduced into the chamber through an opening or port. Thereafter, the material moves downward by gravity until the desired product is finally expelled at the bottom.

Early silo composting chambers were single chamber units lacking any regular agitation or control of the density of the mass or the air circulation throughout the decomposing material. Many of these had air introduced at the bottom of the tank whereby it rose up through the decomposing mass. Often highly pressurized air was required to force air upward through the settling mass. The introduction of air at the bottom of the chamber caused the highest temperatures to be at the bottom, where the material was ready to be removed, instead of at the top of the chamber where most of the decomposition should occur. It was not possible to control the upward flow of the air and if the mass became very dense, the upward flow of air could be severely reduced.

Kneer (U.S. Pat. Nos. 4,249,929; 4,184,269; and 4,062,770) utilizes a single chamber silo with probes distributed throughout the chamber at various levels to measure temperature and moisture content. Air is introduced at the bottom of the chamber, but the temperature and moisture content of the air are carefully monitored. A suction device at the top draws the air upward and out of the chamber whereby it is passed over a heat exchanger and through a water separator. Finally, the exhaust air is passed through a biological filter before exiting the system.

Later silo units are divided into chambers or levels with means to agitate, aerate, and humidify or dehumidify at each level. Improvements in sensing devices and computerized controls enable careful monitoring and more exacting control over temperature and moisture content. Provisions are also made to recycle the heat generated in a reaction chamber to add to the efficiency of the system.

Pitwood (U.S. Pat. No. 3,756,784) developed a silo containing evenly spaced shelves which create a series of chambers each having air and water pipes and individually controlled centered paddles for agitation of the material. The air intake system brings air in from the outside if the pressure within drops, and exhaust valves vent the air to the outside if the pressure is too high or the reaction too fast. The uppermost chambers are also fitted with spray nozzles to provide water if needed. There is a transfer port in the floor of each chamber whereby the material is passed to the chamber below. The material remains in each of the seven chambers for 24 hours. Each chamber can be controlled separately to account for differences in the raw material.

Kaelin (U.S. Pat. No. 3,960,537) utilizes a one chamber silo with a central shaft on which are mounted a series of evenly spaced radial arms containing gas distributor blades. There are exhaust ducts built into the walls of the silo and the heated air is used to warm the new material being introduced into the top of the chamber.

In U.S. Pat. No. 4,358,540, Itoh et al. describe two embodiments of a multichamber silo composting apparatus. In one embodiment, a series of horizontal floors are attached to the circumference of the chamber and a central shaft contains arms which rotate within each chamber to agitate the material therein. The arms contain evenly spaced beaters which revolve as the arms sweep around the chamber. A single motor is mounted at the top of the shaft and provides the power for the central system. The speed of rotation can be varied as needed. In the second embodiment, the shelves are affixed to a central shaft which turns, and the arms with revolving beaters are affixed to one side of the silo. In both systems, the material is allowed to fall successively from one floor to the next below. Air supplied by a blower is admitted through holes in the floor of each chamber.

In all of the silo systems, the material in the reaction chamber or chambers moves downward by gravity. In many of the silo systems having more than one chamber there are no specific means used to control the passing of the mass from one level to the next lower level. As the material is being moved or swept around the floor of the chamber, it falls through the opening provided therein.

BRIEF SUMMARY OF THE INVENTION

The present invention relates to a silo composting system used to process organic refuse which can be in the form of municipal wastes, garden wastes, or sludges. Where municipal wastes are utilized, the material is presorted to remove non-biodegradable components such as plastic, glass and metal. The material is also precut to provide a more uniform particle size which in turn will shorten the processing time. Wood chips, other carbon containing materials or end product compost can be added to the raw material as needed to provide the proper mix for an optimum result.

It is an object of the present invention to provide a silo system for composting which can operate efficiently with more than one large chamber, with each chamber having two or more rotatable and revolving agitator arm assemblies for efficient mixing of the composting mass. The agitator arm assemblies provide constant mixing and tumbling of the material throughout each reaction chamber so as to prevent any clumping or settling before the material is ready to be removed.

It is a further object of the present system to introduce air into the mass through an air delivery pipe which is a part of each agitator arm assembly so as to provide air at more than one level throughout each chamber. The air introduced into the lower chambers can be heated as needed to better control the rate of decomposition.

A further object of the present invention is to have the agitator arm assemblies consist of agitator arms which rotate about each air delivery pipe. A ring gear system affixed to the inner silo wall meshes with gears attached to the agitator arms effecting the rotation as the agitator arm assemblies revolve with the central shaft.

It is a further object of the present invention to have the agitator arm assemblies suspended from a central shaft but also supported at the sides of the cylindrical chamber by the unique ring gear system. It is this two-point support which enables the chamber to be of larger diameter than those systems where the agitator units are supported at one end only.

It is a still further object of the present invention that the floor of each chamber except the lowermost chamber slope downward from the center shaft to create a plenum at the top of the next lower chamber. The sloping floors contain a sliding panel which can be opened only when the material in the chamber is ready to be removed. The floor in the lowermost chamber is horizontal and contains an exit well fitted with a screw auger. Though some material will collect in the well, none is removed until the auger is activated. Shields placed over the openings also prevent material from being packed into them and revolving sweep paddles permit the controlled removal of the material. Opening the sliding panels in the upper chambers permits some material to be selectively removed from each chamber enabling the apparatus to be used as a continuous process reactor if desired.

Another object of the present invention is to have the central shaft in each chamber turned by a motor mounted outside the chamber which turns a gear assembly located inside the chamber. The gear assembly then turns a geared wheel which is connected to the central shaft and causes it to revolve. The force thus applied is on the wheel, not on the shaft itself, which in turn provides a greater machanical advantage than that of having the motor mounted directly on the shafts. As the central shaft revolves, the attached agitator arm assemblies and sweep paddles revolve with it.

It is a further object of the present invention to have a heat exchange system operating throughout the uppermost chamber or zone such that excess heat can be drawn off for heating the air entering the lower chambers as needed. The heat exchange system consists of a closed pipe system located below each agitator arm assembly and containing a heat exchange medium such as water. This heat exchange medium does not itself come in contact with the decomposing mass and is not in danger of contamination. As the temperature of the heat exchange medium rises above a preset level, a circulator is activated to remove heat from the chamber.

It is a still further object of the present invention to have air brought into the system from the outside by fan blowers. This air can be directed into the central shaft where it is dispensed through the air delivery pipes directly into the reaction chambers. The air flow is carefully controlled by solenoid valves such that air can be delivered only to the areas where it is needed. As the air in the upper chamber or zone is warmed, it rises into a plenum at the top of the silo from where it is exhausted and drawn downward by a another fan blower. This air may be passed directly into a lower chamber, it may be warmed over a heating coil if necessary and then introduced into the lower chamber, or it may first be mixed with fresh air from the outside. From the lower chambers the exhaust air passes into separate plenums where exhaust pipes remove the air and other gases and transport them to an exit vent at the top of the silo. A scrubber can be activated at the this exit vent if needed.

Another object of the present invention is to have the central shaft composed of three concentric pipes. The outer pipe turns or revolves while the other two are stationary. The middle pipe is the central air conduit and the innermost pipe is a conduit for electrical wiring.

The silo itself is constructed of two concentric corrugated steel pipes with insulation between the two walls. The system is set on a concrete foundation with a space allowance for a condensation reservoir located in a plenum beneath the lowermost chamber. The main air duct runs along the outside wall and connects to the fan blowers also located outside the silo. The roof of the silo is conical and is insulated with expanded foam insulation. There is an access panel in the roof opening directly into the uppermost chamber through which the raw material is introduced.

The chambers are fitted with water supply pipes equipped with spray nozzles to provide moisture if the mix is too dry. Sensors are utilized to monitor temperature, moisture and air flow, all of which can be controlled manually or by computer actuated controls. The sliding port in the floor of each chamber can also be controlled manually or by computer.

Though the present invention can operate with several chambers, the preferred embodiment utilizes only two.

DETAILED DESCRIPTION OF THE INVENTION

The preferred embodiment of the instant invention can be seen in the accompanying drawings.

Figure 1:
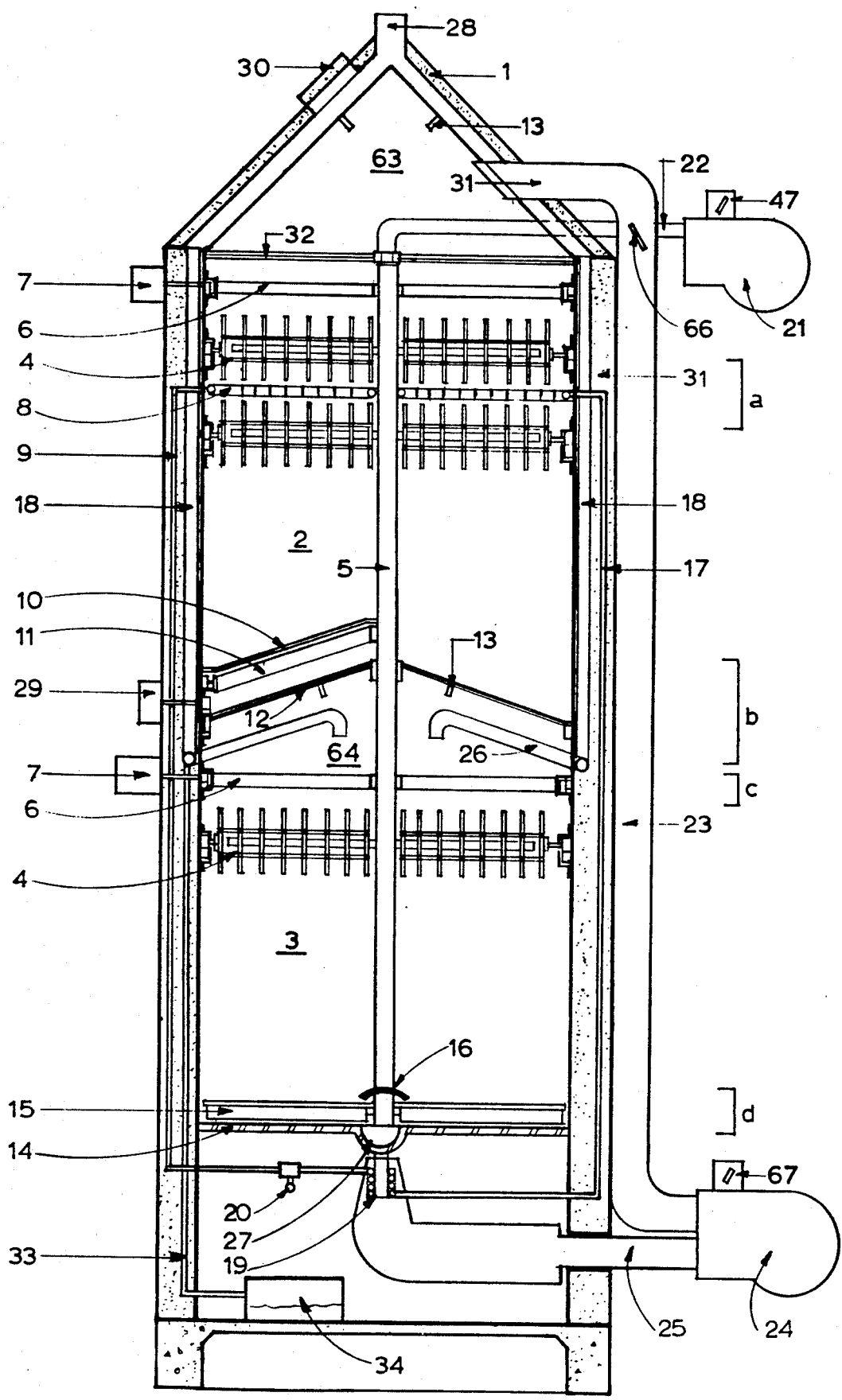
FIG. 1 is a view in vertical section of the silo composting apparatus.

In FIG. 1 can be seen a vertical section of the silo 1, with two chambers 2 and 3. The conical roof forms a plenum 63 at the top of upper chamber 2. The raw material is introduced into the upper chamber 2 by means of entry port 30 at the top of the silo. Each chamber is equipped with two or more sets of agitator arm assemblies 4, the number being governed by the overall height of the silo 1 and the size of the chambers 2 and 3.

Figure 2:
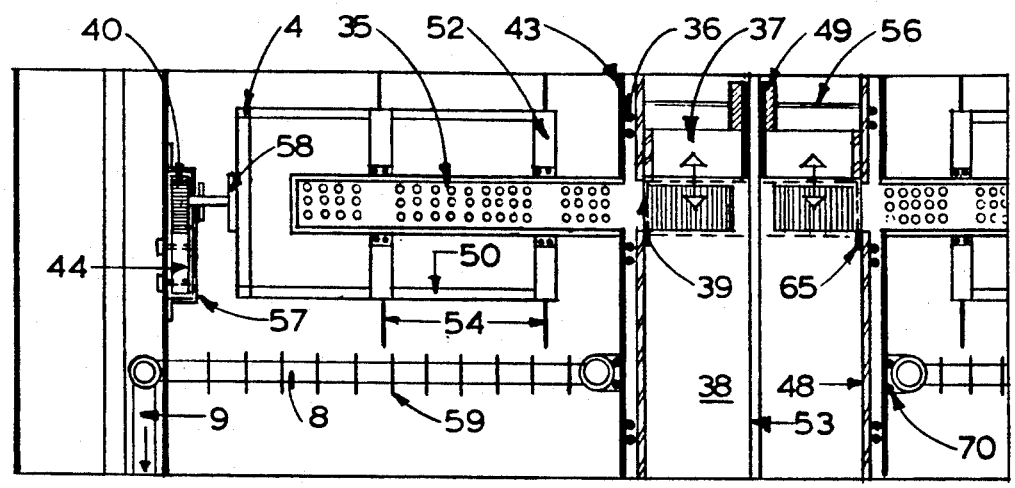
FIG. 2 is an enlarged fragmentary sectional view of area a in FIG. 1 showing the agitator arm assembly, central shaft and heat collecting pipe.
Figure 7:
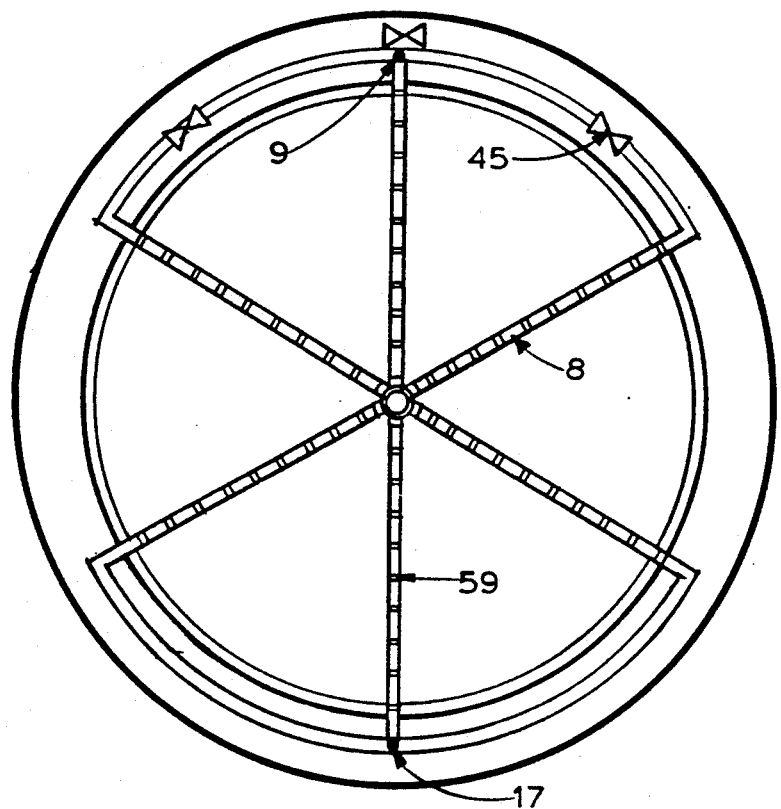
FIG. 7 is a plan view showing the arrangement of the heat exchange system.

Beneath each agitator arm assembly 4 located in the upper chamber 2 is a heat collector assembly 8 which consists of a closed pipe system as illustrated in FIG. 7. Each of the radially spaced pipes has a plurality of heat collecting fins 59 equidistantly spaced along its length. A heat exchange medium such as water is evenly circulated through the system aided by balancing valves 45. As the composting reaction accelerates, heat is given off and raises the temperature of the water in the heat collecting assembly 8. The heated water moves out of the chamber 2 by way of a heat transport circulator pipe 9 and through an hydronic circulator 20 where it can be further circulated through heat transport coil 19, whereby the heat may be used to warm the air entering the lower chamber 3. Thereafter, the water is returned to the heat collector assembly 8 through the heat transport return pipe 17. Bearings 70 (as seen in FIG. 2) maintain the position of the heat collector assembly 8 while the outermost pipe 43 of the central shaft assembly 5 revolves.

Figure 10:
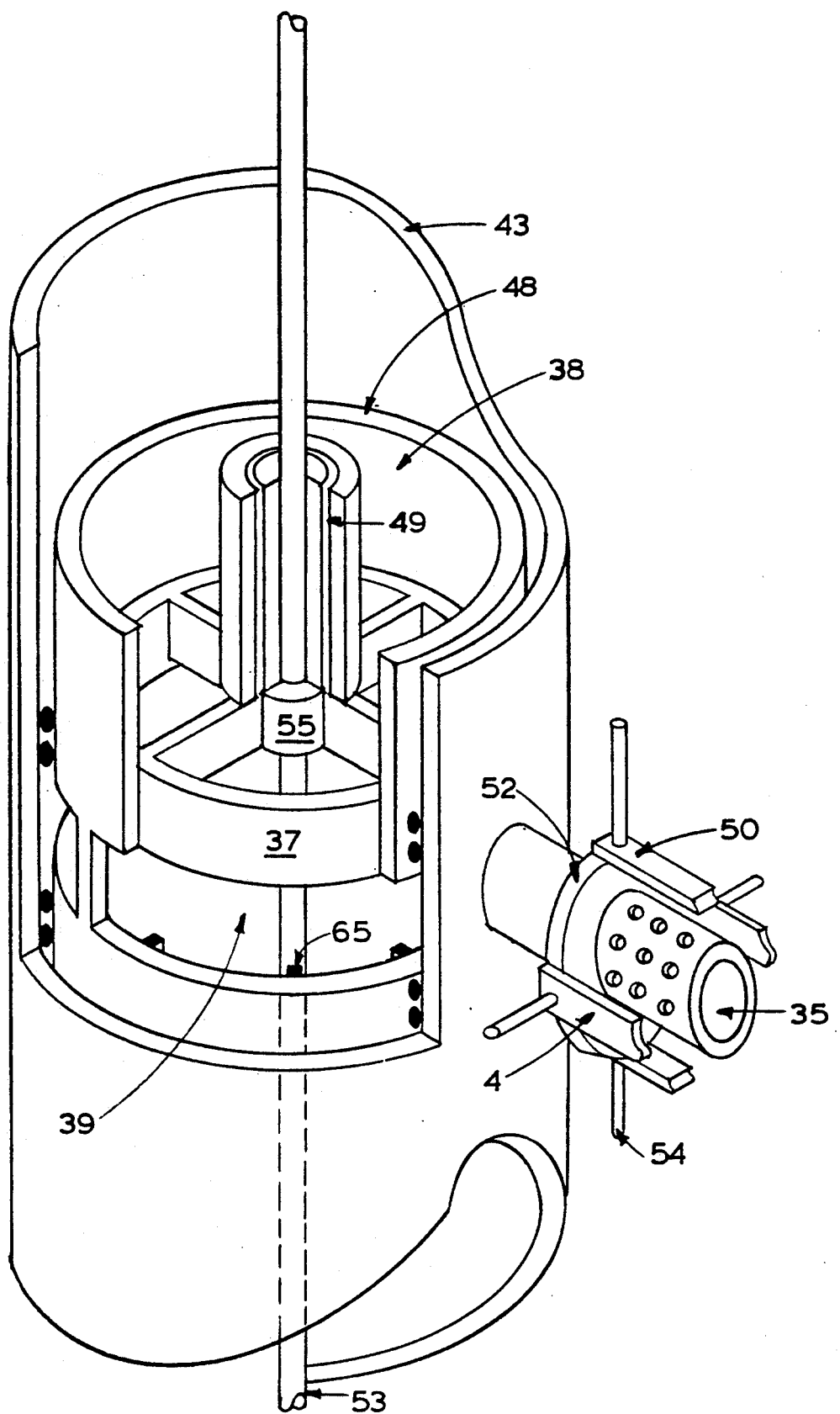
FIG. 10 is an isometric view of the central shaft assembly at the level of an agitator arm showing the solenoid air regulator in the open position and the inner end of the agitator arm assembly.
Figure 11:
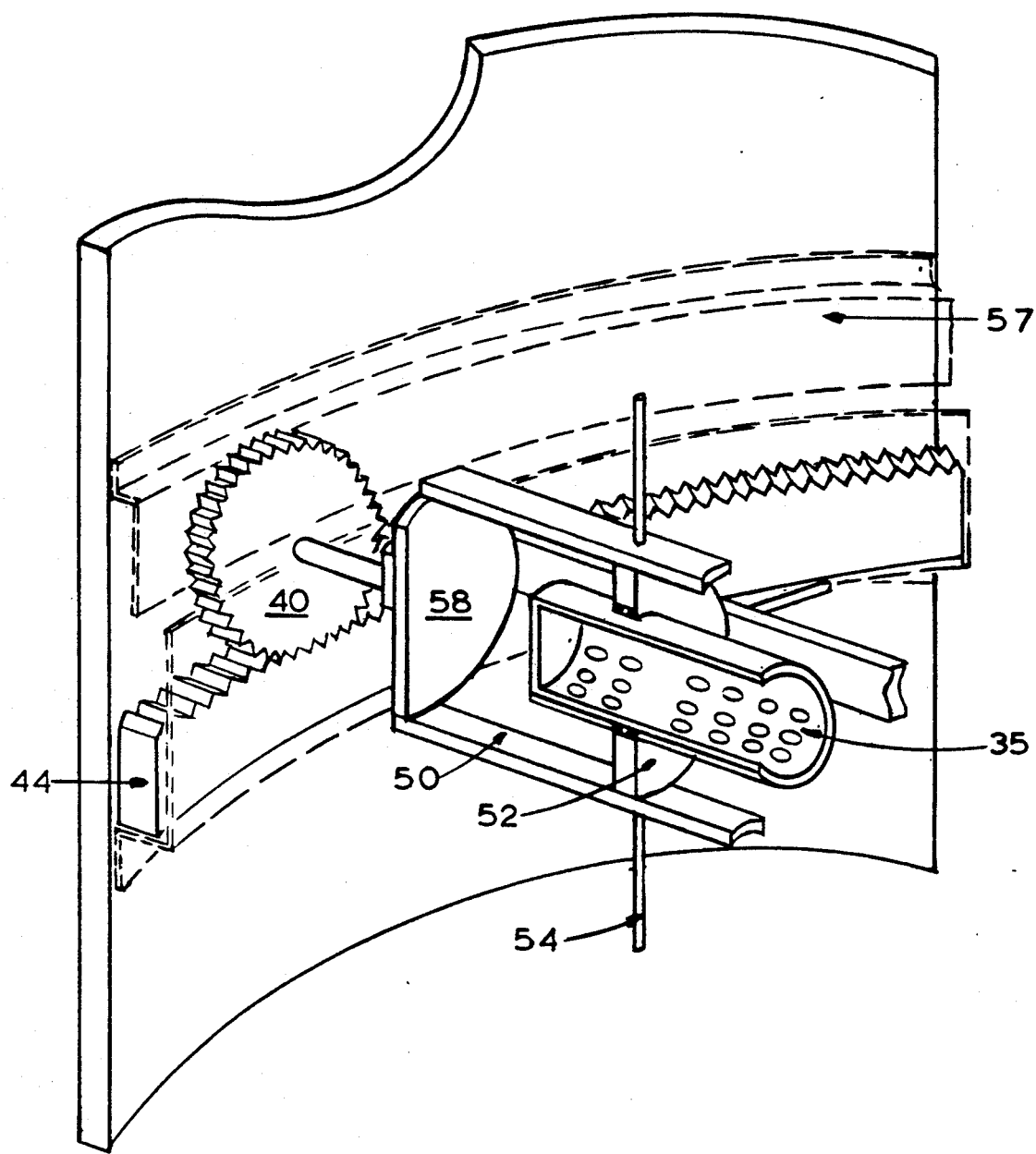
FIG. 11 is a perspective sectional view of the outer end of an agitator arm assembly and circumferential ring gear system.

Each agitator arm assembly 4 is supported at both ends. The inner end is affixed to the outermost pipe 43 of the central shaft assembly 5 as seen in FIG. 10 and the outer end is supported by a unique ring gear system about the inner circumference of the silo as seen in FIG. 11. The ring gear system consists of a geared track, or ring gear 44 affixed to the inner circumference of the silo at the level of each set of agitator arm assemblies 4. As the agitator arm assembly 4 is turned by the outermost pipe 43 of the central shaft assembly 5, gear 40 meshes with the track 44 and is caused to rotate, at the same time causing the connecting plate 58 and rods 50 of the agitator arm assembly 4 to rotate. This action also rotates the plurality of splines 54, spaced along the rods 50, which mix and tumble the composting mass. The whole of track 44 as well as gear 40 is covered by a flexible shield 57, which is seen in FIG. 11.

Figure 3:
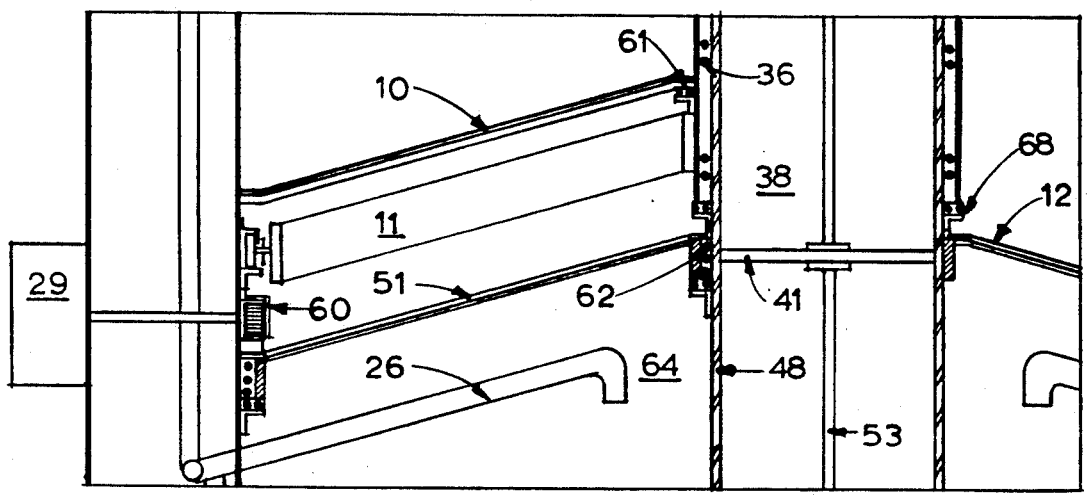
FIG. 3 is an enlarged fragmentary sectional view of area b in FIG. 1 showing the shield, paddle and floor of the upper chamber and the lower chamber exhaust collection pipes.
Figure 9:
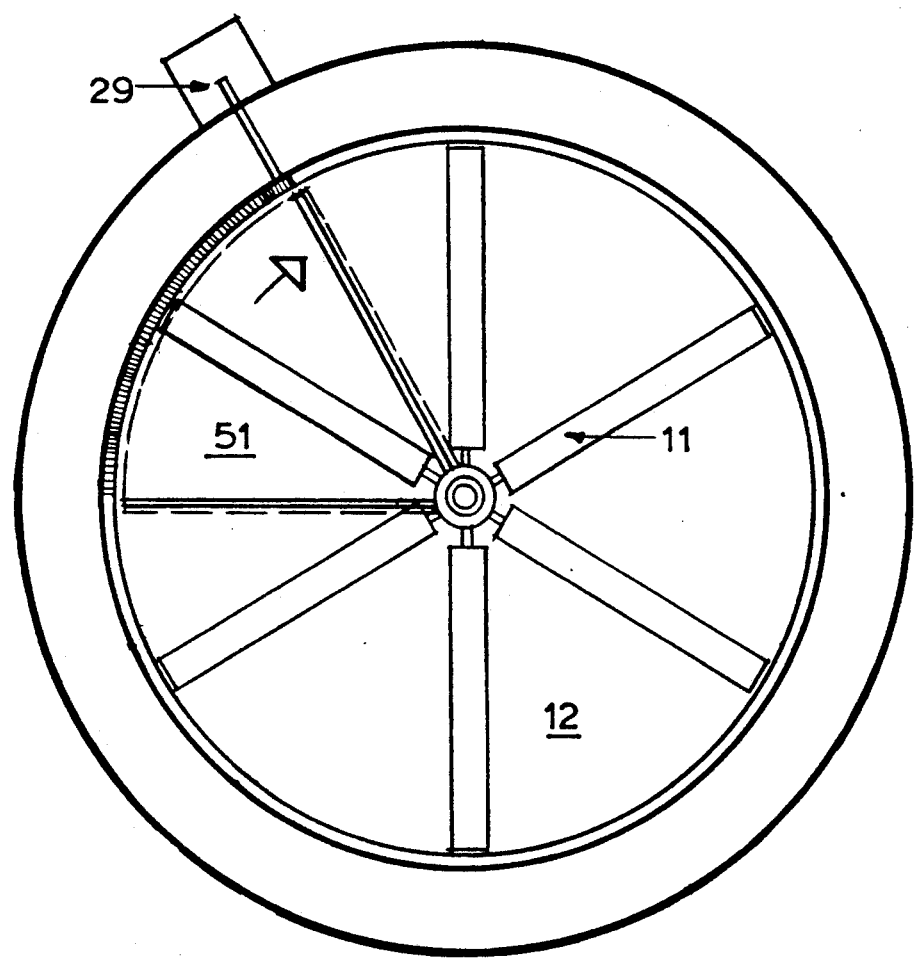
FIG. 9 is a plan view showing the sweep paddles and the movable floor panel of the upper chamber.

The floor 12 of chamber 2 is supported at the middle stationary pipe 48 of the central shaft assembly 5 and is sloped downward from the central shaft assembly 5 toward the circumference of the silo forming a plenum 64 at the top of lower chamber 3. The floor 12 contains a sliding panel 51 (seen in FIG. 9) which is opened and closed by motor 29 and gear 60 (seen in FIG. 3) when the material is ready for removal from the chamber 2. A bearinged connector 62 permits the panel 51 to slide open. A shield 10 covers the sliding panel 51 to prevent the material from being passed through in a mass when the panel 51 is opened. The shield 10 is also supported at the central shaft assembly 5 by a bearinged connector 61 so that it does not turn with the shaft. The sweep paddle assembly 11 connected to and turned by the outermost pipe 43 of the central shaft assembly 5 moves the material around the floor and out of the chamber when the panel 51 is opened. The material can thus be removed a part at a time in measured quantities allowing the chamber to be used as a continuous process reactor.

Figure 5:
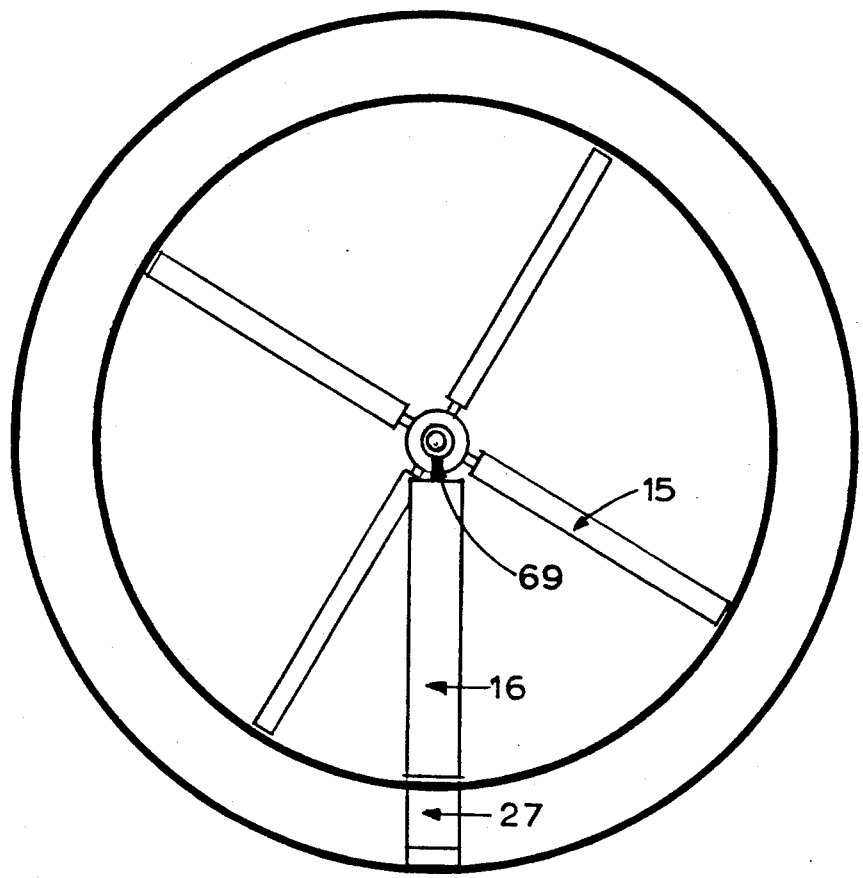
FIG. 5 is a plan view of the sweep paddles and exit well in the floor of the lower chamber.
Figure 6:
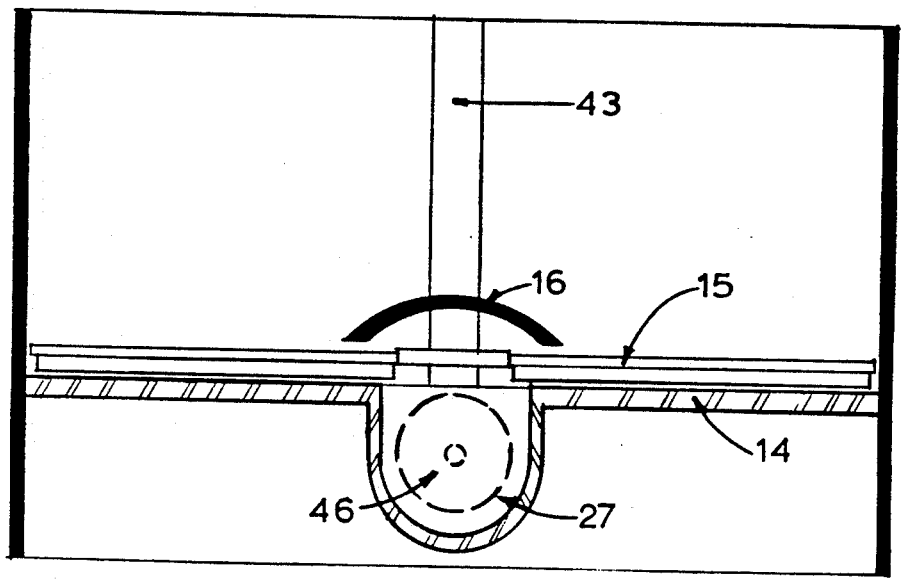
FIG. 6 is a sectional view through area d in FIG. 1 showing the lower chamber exit well, shield and silo floor.

The floor 14 of the lower chamber 3 as shown in FIG. 6 is horizontal and contains an exit well 27. This exit well 27 is covered by a shield 16 (see also FIG. 5)

supported by the central shaft assembly 5, and connected by a bearinged ring 69 such that the shield 16 does not revolve with the central shaft assembly 5. There is also a sweep paddle assembly 15 which is connected to and does revolve with the outermost pipe 43 of the central shaft assembly 5 so as to move the material into the exit well 27 from which it is removed in measured quantities by controlling the screw auger 46.

The central shaft assembly 5 is supported at the top by support struts 32, as seen in FIG. 1, attached to the inner circumference of the silo. The central shaft assembly 5 is actually composed of three concentric pipes which are clearly seen in FIG. 10. The outermost pipe 43 is the part that revolves and likewise causes the agitator arm assemblies 4 and the sweep paddle assemblies 11 and 15 to revolve. This outermost pipe 43 is divided into two sections, one in each chamber, each of which is turned independently by a motor 7 and drive wheel 6, and is supported by a ledge 68 affixed to the middle pipe 48. The support ledge 68 for the section in the upper chamber 2 can be seen in FIG. 3. The middle pipe 48 is stationary and contains a series of slotted openings 39 around its circumference at the level of each set of agitator arm assemblies. The open space within the middle pipe 48 is the central air conduit 38. The innermost pipe 53 is much smaller in diameter than the other two and is stationary. It functions as a conduit for electrical wires and serves as support for the mechanism controlling the airflow to the agitator arm assemblies 4. Said mechanism (seen in FIG. 2 and FIG. 10) consists of a floating wheel or valve 37, centered about innermost pipe 53, which when lowered closes off openings 39 in the middle pipe 48 preventing air flow into the air delivery pipes 35. Stops 65 prevent the valves from dropping beyond the openings 39. The sleeve portion 55 of the valve 37 rests within a solenoid 49 which is held in place by support rods 56. The valve 37 drops when the solenoid is deactivated, closing off openings 39. Each solenoid 49 can function independently and therefore the air flow is carefully controlled, not only into each chamber, but to each level within a chamber.

Fresh air is brought into the silo by fan blowers 21 and 24. The quantity of fresh air entering and the air flow are controlled by dampers 47, 67, and 66. The fresh air is brought in when more oxygen is needed for the aerobic decomposition and also when cooling becomes necessary. At such times fan blowers 21 and 24 are activated and dampers 47 and 66 are opened. The fresh air enters upper chamber 2 through air pipe 22. At the same time, the warm moist exit gases leave the upper chamber 2 through exit port 31 and pass into insulated air pipe 23 and on to fan blower 24. Damper 67 is closed. Fan blower 24 circulates the warm moist exit gases into lower chamber 3 through air pipe 25. If further warming of the exit gases becomes necessary before they are passed into the lower chamber 3, the hydronic circulator 20 is activated thus circulating the heated water through heat transport coil 19 located within air pipe 25. Bacteria present in the exit gases assist in the further processing within lower chamber 3 and also can serve to deodorize the gas mixture that exits lower chamber 3. If fresh air or temperature reduction or both are necessary in chamber 3, damper 66 is closed, damper 67 is opened and fan blower 24 is activated to bring in fresh air from the outside.

The air entering upper chamber 2 passes from air pipe 22 into the central air conduit 38 of the central shaft assembly 5 from the top and the air going into the lower chamber 3 by way of air pipe 25 enters the central air conduit 38 from the bottom. From central air conduit 38 the air is fed into the air pipes 35 of the agitator arm assemblies 4. A fixed divider panel 41 inside the middle pipe 48 dividids the central air conduit 38 into two sections thereby separating the air flow systems of the two chambers 2 and 3.

A series of radially spaced exhaust gas collecting pipes 26 located in plenum 64 take the exhaust gases from the lower chamber 3 and conduct the gases through the exhaust gas exit pipes 18 directly to gas exhaust port 28 at the top of the silo. The exit gases may thereafter be passed through a scrubber or deodorizer as needed. The exhaust gas collecting pipes 26 are angled downward so as to prevent any moisture which may condense therein from returning to the lower chamber 3. Moisture condensing in the pipes is removed through pipe 33 and collected in a condensate reservoir 34 located below the lower chamber 3. The condensate can be treated or reused as needed.

Spray nozzles 13 are located at the top of the each chamber to provide moisture to the reacting mass as needed.

Figure 8:
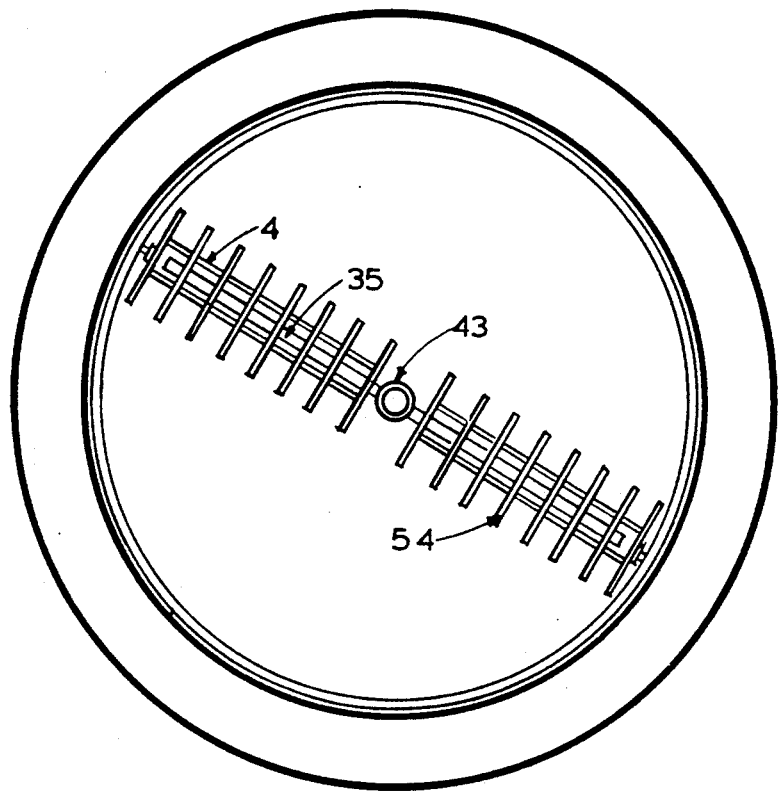
FIG. 8 is a plan view of one level of the agitator arm assemblies.

FIG. 2 shows the detail of the agitator arm assembly 4. The assembly contains a central air delivery pipe 35 having a plurality of openings on the side opposite the direction of revolution so that the material being processed cannot collect in the openings. Bearing housings 52 connected to the agitator arm rods 50 are spaced along the air delivery pipe 35 so the agitator arm rods 50 can rotate smoothly. A plurality of splines 54 are connected to the rods 50. The entire assembly rotates as a unit about the air delivery pipe 35. The connecting plate 58 located at the outer end of the assembly is turned by gear 40 which effects the rotation. Two oppositely oriented agitator arm assemblies 4 (FIG. 8) comprise a set and revolve simultaneously with the outer pipe 43 of the central shaft assembly 5.

Figure 4:
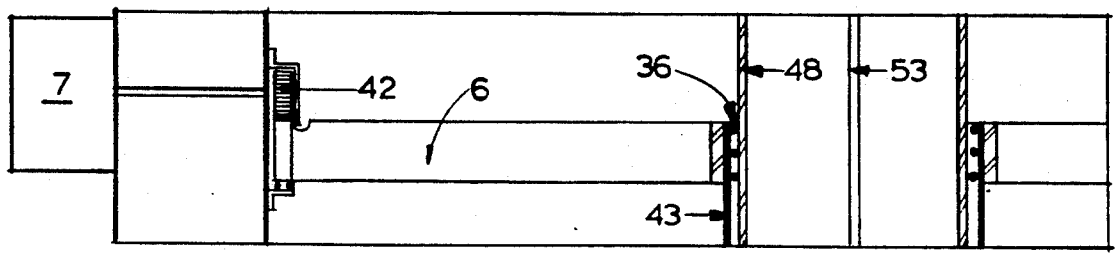
FIG. 4 is an enlarged fragmentary sectional view of area c in FIG. 1 showing the motor, engaging gears and central shaft drive wheel.

FIG. 4 shows the central shaft drive wheel 6 for the lower chamber 3. The motor 7 turns the gear 42 that turns the drive wheel 6 and the lower section of outer pipe 43 of the central shaft assembly 5. Bearings 36 permit the outer pipe 43 to turn smoothly about the middle pipe 48.

Sensors are placed at several levels in each chamber to monitor temperature, humidity and air flow. The information is directed to computers which control the introduction of water into the chambers, the activation of the heat exchange circulator, the introduction of air by the fan blowers, the opening and closing of the dampers, and the solenoids which activate the air flow valves regulating air flow into each air delivery pipe. These functions may also be controlled manually.

While one embodiment of the invention has been illustrated and described in detail it is to be understood that this invention is not limited thereto and may be otherwise practiced within the scope of the following claims.

I claim:

1. A composting apparatus for processing municipal and industrial organic waste materials and sludges comprising:

(a) a vertical container having at least one floor dividing said container into processing chambers arranged one above the other;

(b) inlet means to admit the waste materials to the container;

(c) means within each of said chambers to prevent compacting of the waste materials, said means being a plurality of arm assemblies situated at multiple levels within each of said chambers and capable of revolution and rotation, each arm assembly having an axial end and a circumferential end;

(d) air delivery means for introducing air into said waste material, and said air delivery means being integral with said arm assemblies for simultaneous agitation, aeration and temperature control;

(e) air control means for controlling the flow of air into the air delivery means;

(f) air conduit means to provide air to said air delivery means;

(g) stabilizing means to support each arm assembly at its circumferential end and capable of causing each arm assembly to rotate horizontally by coaction therewith so as to continuously agitate the waste material, prevent compaction thereof and provide efficient distribution of air thereto;

(h) shaft assembly means common to all chambers, supporting said arm assemblies at their axial ends, and containing means to revolve said arm assemblies about said shaft assembly means;

(i) means to remove exhaust gases from the chambers;

(j) means to circulate exhaust gases removed from the uppermost chamber through the processed material in the lowermost chamber to filter said gases and remove odors and moisture therefrom;

(k) port means in the floor of each chamber for allowing passage of the waste material therethrough;

(l) closing means in the floors of all but the lowermost chamber for controlled transfer of the material through the port means to the chamber below;

(m) well means below the lowermost chamber to receive processed material;

(n) material transport means located within said well means to remove processed materials from the container;

(o) sweep means to move said materials to said port means and to control quantities of the materials removed;

(p) shield means for prevention of material falling into said port means in unmeasured quantities;

(q) heat collecting means situated immediately below each arm assembly in all but the lowermost chamber for removal of heat generated by aeration and agitation of said material in excess of heat needed to maintain predetermined temperatures;

(r) heat circulating means to conduct said excess heat out of said chambers and to warm air entering the lowermost chamber to maintain predetermined temperatures as needed;

(s) air supply means to provide air to said air conduit means;

(t) spray means to deliver water to the chambers as needed to maintain predetermined humidity;

(u) sensor means to monitor temperature, humidity and air flow in all of the chambers.

2. A composting apparatus as in claim 1 wherein the shaft assembly means comprises three concentric pipes; an innermost pipe which supports the air control means and contains electrical wires; a middle pipe which functions as the air conduit means and having a plurality of slots about its circumference at the levels of the arm assemblies; and an outermost pipe which is segmented, with one segment in each chamber, said segments being integral with and axially supporting the arm assemblies and each segment being capable of independent revolution.

3. A composting apparatus as in claim 2 wherein each segment of the outermost pipe is revolved by a drive wheel, axially integrated with said segment, and capable of having a turning force applied circumferentially thereto for even distribution of said force so as to maintain continuous revolution of said drive wheel and said segment.

4. A composting apparatus as in claim 1 wherein the sweep means comprises at least two radially oriented paddles capable of revolution about said shaft assembly means and being situated immediately above the floor in each of the chambers.

5. A composting apparatus as in claim 1 wherein there is a partition within the air conduit means to segregate the air entering the lowermost chamber from the air entering the other chambers.

6. A composting apparatus as in claim 1 wherein the stabilizing means comprises a ring gear fixedly attached about the circumference of the chamber at the level of the arm assembly.

7. A composting apparatus as in claim 1 wherein all of said floors excepting the lowermost floor are slanted downward toward the periphery of the chamber so as to form a plenum in the chamber below.

8. A composting apparatus as in claim 1 wherein the means to remove exhaust gases comprises a plurality of radially disposed pipes, said pipes being slanted downward toward the circumference of the chambers such that moisture condensing from the exhaust gases therein cannot be returned to the chambers and said exhaust gases being thereafter directed to an exhaust port at the top of the container and said moisture being directed to a reservoir beneath the container.

9. A composting apparatus as in claim 1 wherein the means to circulate exhaust gases from the uppermost chamber is an exhaust conduit, said exhaust conduit being integral with the air supply means.

10. A composting apparatus as in claim 1 wherein the air control means comprises valves, each valve being substantially in the shape of a wheel and having a central arbor extending above said wheel; each of said arbors resting within a solenoid; and said valves and said solenoids being situated within and being supported by the shaft assembly, 11. A composting apparatus as in claim 1 wherein the air supply means comprises air supply pipes and two fan blowers located outside and contiguous to the container; air flow from said fan blowers being regulated by dampers; and means to control said fan blowers and dampers.

12. A composting apparatus as in claim 1 wherein the closing means in the floors of all but the lowermost chamber for controlled transfer of the material to the chamber below comprises a slidable panel covering said port means and means to open and close said slidable panel.

13. A composting apparatus as in claim 1, wherein said arm assembly and said air delivery means comprises:
tube means for delivery of air, said air delivery tube means having a plurality of perforations located on the side opposite the direction of revolution;
a plurality of housing means, said housing means being bearing housings, disposed about the air delivery tube means;

at least two agitator arm rods equidistantly diposed and fixedly connected to said bearing housings such that said arm rods are capable of rotation about said air delivery tube means, and each of said arm rods having a plurality of splines attached thereto;

said arm rods being integral at their circumferential ends with a plate; said plate communicating with a gear;

said gear being capable of coaction with a geared track, for circumferential support of the arm assembly and to cause said arm rods to rotate; and support means located at the axial end of said arm assembly, said support means being integral with said air delivery tube and capable of causing said arm assembly to revolve.

14. A composting apparatus as in claim 1, wherein said heat collecting means and said heat circulating means comprises:

a series of radially disposed integral heat collecting pipes; each of said pipes having a plurality of heat collecting fins; said pipes being integrated with heat transport pipes; a heat transport medium within said pipes; and means to circulate said heat transport medium.

* * * * *